US011079953B2

(12) United States Patent
Hirsch et al.

(10) Patent No.: US 11,079,953 B2
(45) Date of Patent: *Aug. 3, 2021

(54) PACKING DEDUPLICATED DATA INTO FINITE-SIZED CONTAINERS

(71) Applicant: INTERNATIONAL BUSINESS MACHINES CORPORATION, Armonk, NY (US)

(72) Inventors: Michael Hirsch, Mazkeret Batya (IL); Thorsten Krause, Kisslegg (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 548 days.

This patent is subject to a terminal disclaimer.

(21) Appl. No.: 15/843,161

(22) Filed: Dec. 15, 2017

(65) Prior Publication Data

US 2018/0113643 A1 Apr. 26, 2018

Related U.S. Application Data

(63) Continuation of application No. 13/526,834, filed on Jun. 19, 2012, now Pat. No. 9,880,771.

(51) Int. Cl.
*G06F 3/06* (2006.01)

(52) U.S. Cl.
CPC .......... *G06F 3/0641* (2013.01); *G06F 3/0608* (2013.01); *G06F 3/0689* (2013.01)

(58) Field of Classification Search
CPC ..... G06F 3/0689; G06F 3/0608; G06F 3/0641
See application file for complete search history.

(56) References Cited

U.S. PATENT DOCUMENTS 7,165,095 B2   1/2007 Sim
7,287,019 B2  10/2007 Kapoor et al.
(Continued)

FOREIGN PATENT DOCUMENTS

CA    2817119 A1    6/2012
CN  101094124 A   12/2007
(Continued)

OTHER PUBLICATIONS

Anonymous, "Method for Identifying Image Objects With Similar Intent from Multiple Documents to aid Block Level De-duplication in storage clouds" An IP.com Prior Art Database Technical Disclosure, IP.com No. IPCOM000210334D, Aug. 30, 2011 (8 pages).

*Primary Examiner* — Miranda Le
(74) *Attorney, Agent, or Firm* — Griffiths & Seaton PLLC

(57) ABSTRACT

Deduplicated data is packed into finite-sized containers. A similarity score is calculated between files that are similarly of the deduplicated data. The similarity score is used for grouping the similarly compared files of the deduplicated data into subsets for destaging each of the subsets from a deduplication system to one a finite-sized container. The similarity score is used for grouping the similarly compared files of the deduplicated data into subsets for destaging each of the subsets from a deduplication system to one of the finite-sized containers. An indication is received by a user of which of the similarly compared files are to be grouped into the subsets for destaging each of the subsets from a deduplication system to one of the finite-sized containers. Transitive closures are used for assisting with using the similarity score for grouping the similarly compared files of the deduplicated data into the subsets.

6 Claims, 6 Drawing Sheets

(56) References Cited

U.S. PATENT DOCUMENTS

| | | | |
|---|---|---|---|
| 7,610,283 B2 | 10/2009 | Arasu et al. | |
| 7,711,912 B2 | 5/2010 | Sandrock-Grabsky | |
| 7,734,669 B2 | 6/2010 | Kottomtharayil et al. | |
| 7,912,842 B1* | 3/2011 | Bayliss | G06F 16/2471 707/749 |
| 8,260,748 B1 | 9/2012 | Manko et al. | |
| 8,280,861 B1* | 10/2012 | Park | G06F 16/951 707/692 |
| 8,291,183 B2 | 10/2012 | McCloskey et al. | |
| 8,364,716 B2 | 1/2013 | Gaonkar et al. | |
| 8,370,594 B2 | 2/2013 | Niles et al. | |
| 8,380,681 B2 | 2/2013 | Oltean et al. | |
| 8,392,376 B2* | 3/2013 | Guo | G06F 16/1748 707/664 |
| 8,463,742 B1 | 6/2013 | Floyd et al. | |
| 8,611,678 B2* | 12/2013 | Hanson | G06F 16/51 382/225 |
| 8,694,466 B2* | 4/2014 | Rao | G06F 16/128 707/637 |
| 8,849,878 B1 | 9/2014 | Bachu et al. | |
| 8,874,523 B2 | 10/2014 | Vickrey et al. | |
| 8,949,829 B1 | 2/2015 | Xing et al. | |
| 8,996,462 B2 | 3/2015 | MacAskill et al. | |
| 9,122,639 B2 | 9/2015 | Kennedy et al. | |
| 9,176,978 B2 | 11/2015 | Wideman | |
| 9,256,609 B2* | 2/2016 | Rao | G06F 3/0619 |
| 9,274,897 B2 | 3/2016 | Clifford et al. | |
| 9,372,809 B2* | 6/2016 | Testardi | G06F 11/1453 |
| 9,448,739 B1 | 9/2016 | Nagarkar et al. | |
| 2003/0182310 A1 | 9/2003 | Charnock et al. | |
| 2008/0313128 A1 | 12/2008 | Arasu et al. | |
| 2009/0043983 A1 | 2/2009 | Yagawa | |
| 2009/0083563 A1 | 3/2009 | Murase | |
| 2010/0042790 A1 | 2/2010 | Mondal et al. | |
| 2010/0088296 A1 | 4/2010 | Periyagaram et al. | |
| 2010/0180075 A1 | 7/2010 | McCloskey et al. | |
| 2010/0198797 A1 | 8/2010 | Wideman | |
| 2010/0306412 A1 | 12/2010 | Therrien et al. | |
| 2010/0333116 A1 | 12/2010 | Prahlad et al. | |
| 2011/0071989 A1* | 3/2011 | Wilson | G06F 16/1748 707/692 |
| 2011/0099351 A1 | 4/2011 | Condict | |
| 2011/0289290 A1 | 11/2011 | Akirav et al. | |
| 2012/0041957 A1 | 2/2012 | Hsu et al. | |
| 2012/0089775 A1 | 4/2012 | Ranade et al. | |
| 2012/0131025 A1 | 5/2012 | Cheung et al. | |
| 2012/0137054 A1 | 5/2012 | Sadri et al. | |
| 2012/0143835 A1 | 6/2012 | Aronovich et al. | |
| 2012/0166448 A1 | 6/2012 | Li et al. | |
| 2012/0233135 A1 | 9/2012 | Tofano | |
| 2012/0233417 A1 | 9/2012 | Kalach et al. | |
| 2012/0303590 A1 | 11/2012 | Chernow | |

FOREIGN PATENT DOCUMENTS

| | | |
|---|---|---|
| CN | 101714147 A | 5/2010 |
| CN | 102185889 A | 9/2011 |
| CN | 102222085 A | 10/2011 |
| CN | 102308288 A | 1/2012 |
| CN | 102323958 A | 1/2012 |

\* cited by examiner

PACKING DEDUPLICATED DATA INTO FINITE-SIZED CONTAINERS

CROSS-REFERENCE TO RELATED APPLICATIONS

This Application is a Continuation of U.S. patent application Ser. No. 13/526,834, filed on Jun. 19, 2012, the contents thereof hereby incorporated by reference.

BACKGROUND OF THE INVENTION

Field of the Invention

The present invention relates in general to computers, and more particularly to packing deduplicated data into finite-sized containers in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data is copied again and again and forwarded without any change, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

Data deduplication refers to the reduction and/or elimination of redundant data. In data deduplication, a data object, which may be a file, a data stream, or some other form of data, is broken down into one or more parts called sub-blocks. In a data deduplication process, duplicate copies of data are reduced or eliminated, leaving a minimal amount of redundant copies, or a single copy of the data, respectively. Using deduplication processes provides a variety of benefits, such as reduction of required storage capacity and increased network bandwidth. Due to these and other benefits, deduplication has emerged in recent years as a highly important technological field in computing storage systems.

Very often, the data entrusted to a deduplicating system must also be exported and/or backed up to a different site. This may be accomplished by replicating the data to a remote repository or rehydrating the deduplicated data and writing the rehydrated data to physical tape. However, replicating data in its deduplicated form, to a remote site, is an inefficient process. This is because data centers produce large amounts of data each day and the new data is sufficiently unique that either the new data does not deduplicate or does not deduplicate efficiently. Moreover, the bandwidth requirements are difficult to gauge since the data centers are dependent on both the amount of data that did not deduplicate and also the service level agreement of when data is expected to complete the replication process. In addition, the rehydration process stretches data center resources and bandwidth, along with adding management overhead. The rehydration process also requires physical cartridges to be in proportion to the amount of user data backed up, rather than the physical cartridges to be in proportion to the deduplicated size of this data.

In contrast, and in order to address these inefficiencies, the illustrated embodiments described herein provide as solution for exporting deduplicated data from a deduplication system to an alternative location that increases efficiency and performance. Accordingly, and in view of the foregoing, various exemplary method, system, and computer program product embodiments for packing deduplicated data into a plurality of finite-sized containers in a computing environment, are provided. In one embodiment, by way of example only, the method comprises calculating a similarity score between a plurality of similarly compared files of the deduplicated data, the similarity score indicating an overall deduplication ratio between the similarly compared files of the deduplicated data; wherein calculating the similarity score further includes calculating an nth percentage threshold of common data intersections shared between the plurality of similarly compared files of the deduplicated data, and wherein a transitive closure between the plurality of similarly compared files of the deduplicated data is determined. The similarity score is used for grouping the plurality of similarly compared files of the deduplicated data into subsets for destaging each of the subsets from a deduplication system to one of the plurality of finite-sized containers; wherein a sum a data space of all of the plurality of the plurality of finite-sized containers is substantially equal to the overall deduplication ratio. An indication is received by a user of which of the plurality of similarly compared files are to be grouped into the subsets for destaging each of the subsets from a deduplication system to one of the plurality of finite-sized containers. The transitive closures are used for assisting with using the similarity score for grouping the plurality of similarly compared files of the deduplicated data into the subsets.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Throughout the following description and claimed subject matter, the following terminology, pertaining to the illustrated embodiments, is described. A "file" is intended to describe the abstract management unit that a deduplicating system uses to bridge between a user's view of an object (stream of bytes that were sent to the deduplicating system, which might be a part of one or more "user files") and the object's internal, deduplicated representation (usually a list of pointers to common and non-common data segments in the repository). A "repository" is intended to refer to a disk subsystem.

As mentioned previously, data entrusted to a deduplicating system often times is required to be exported and/or backed up to a different site. However, a need exists increased efficiency for exporting deduplicated data from a deduplication system to an alternative location that increases efficiency and performance. Thus, the illustrated embodiments that will be described below provide for packing mutually deduplicated data into finite-sized containers. In one embodiment, by way of example only, a similarity score is calculated between files that are similarly of the deduplicated data. The similarity score is used for grouping the similarly compared files of the deduplicated data into subsets for destaging each of the subsets from a deduplication system to one a finite-sized container.

Figure 1:
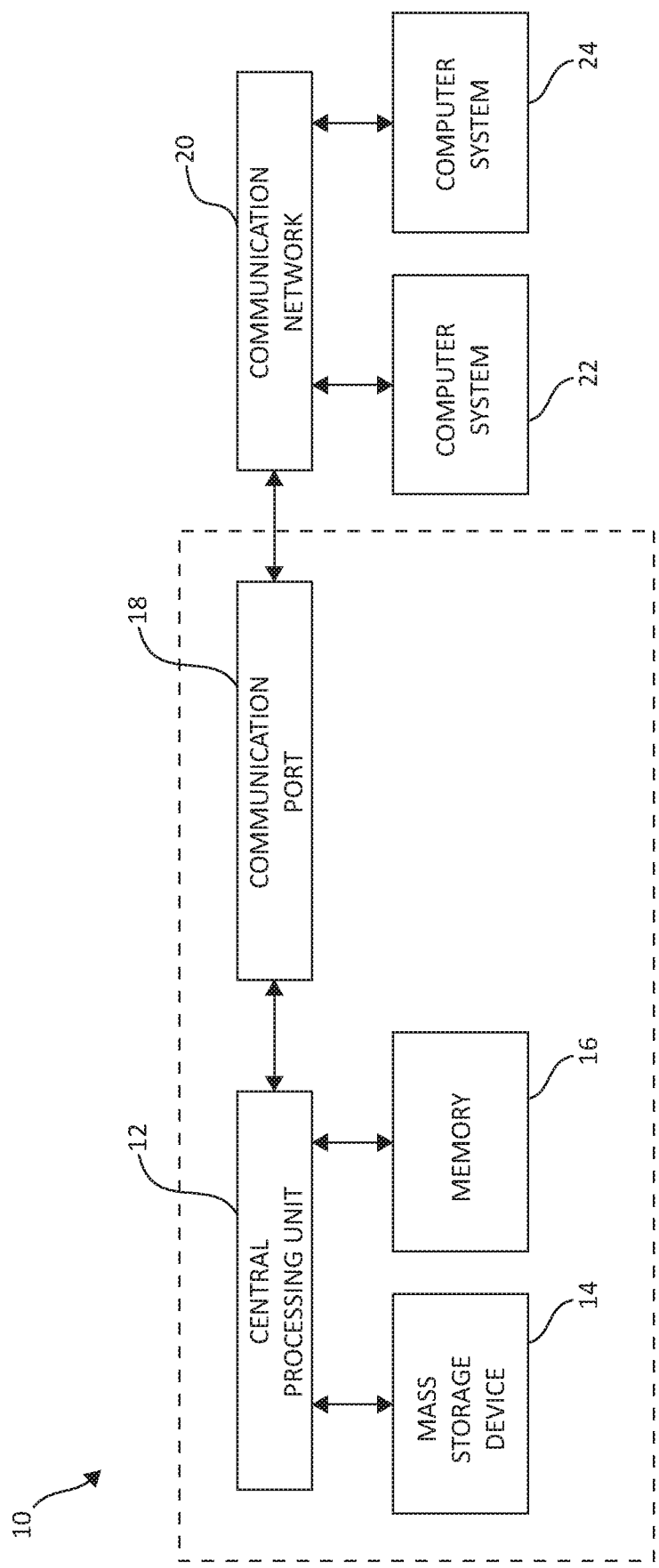
FIG. 1 is a block diagram illustrating a computing system environment having an example storage device in which aspects of the present invention may be realized.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 22, 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 22, 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
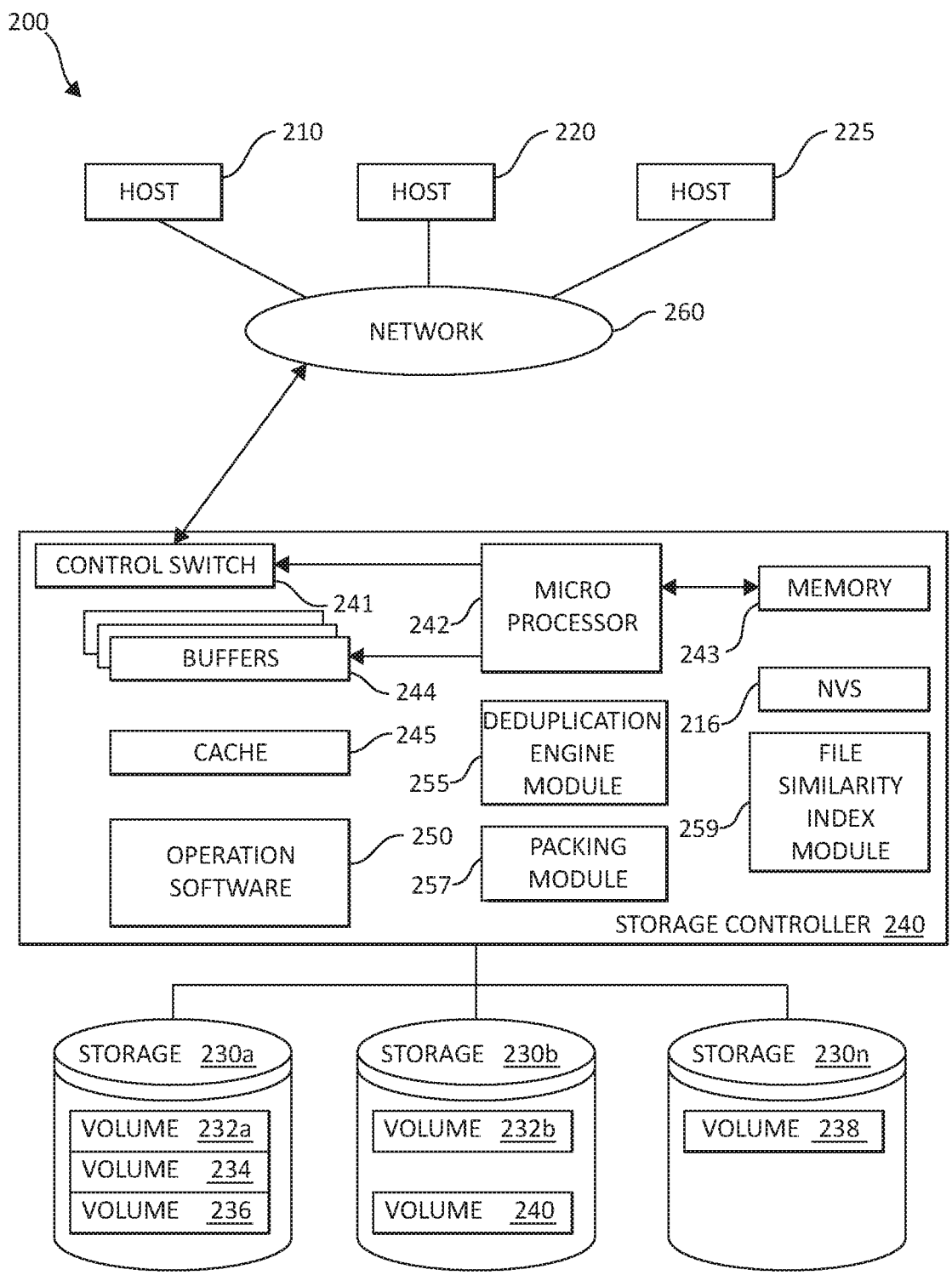
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER™ TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a deduplication engine module 255, a packing module 257, and a file similarity index module 259. The deduplication engine module 255, the packing module 257, and the file similarity index module 259 may work in conjunction with each and every component of the storage controller 240, the hosts 210, 220, 225, and storage devices 230. The deduplication engine module 255, the packing module 257, and the file similarity index module 259 may be structurally one complete module or may be associated and/or included with other individual modules. The deduplication engine module 255, the packing module 257, and the file similarity index module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the deduplication engine module 255, the packing module 257, and the file similarity index module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, deduplication engine module 255, the packing module 257, and the file similarity index module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the deduplication engine module 255, the packing module 257, and the file similarity index module 259 may also be located in the cache 245 or other components. As such, one or more of the deduplication engine module 255, the packing module 257, and the file similarity index module 259 maybe used as needed, based upon the storage architecture and users' preferences.

Figure 3:
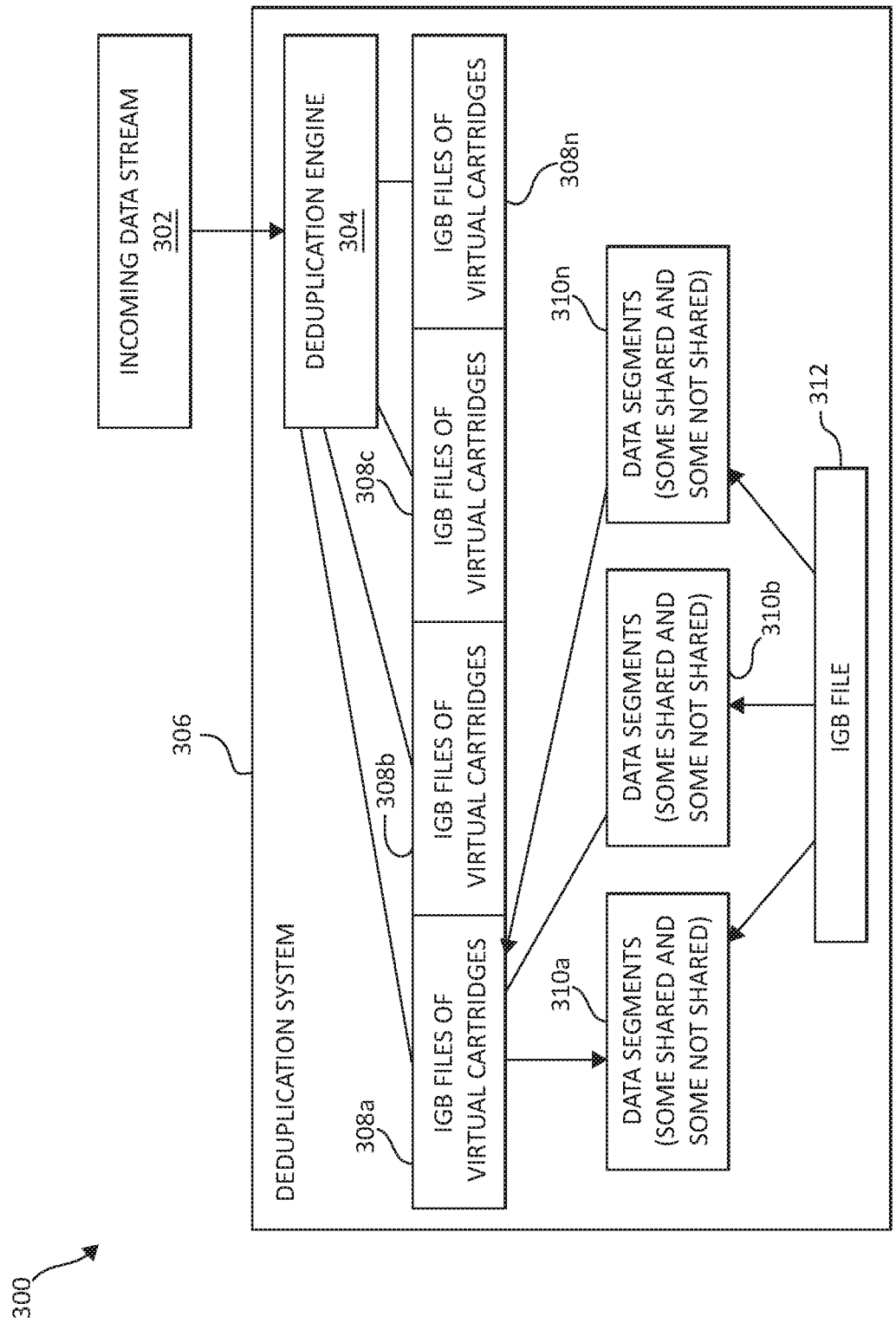
FIG. 3 is a block diagram illustrating an exemplary deduplication system in which aspects of the present invention may be realized.
Figure 4:
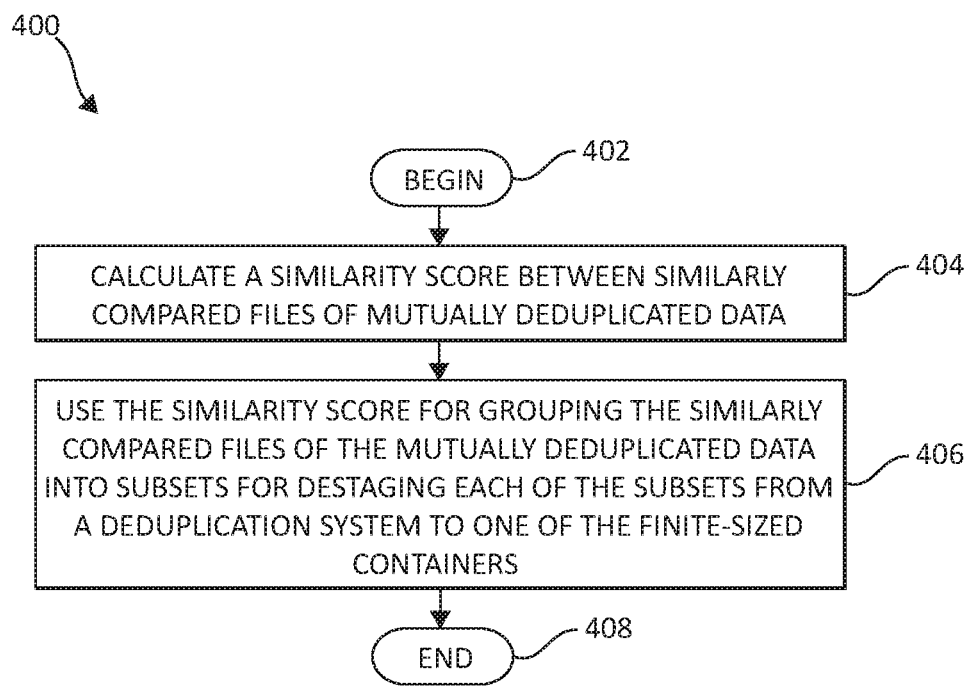
FIG. 4 a flowchart illustrating an exemplary method for packing deduplicated data into a plurality of finite-sized containers.

Turning now to FIGS. 3, 4, and 5, the process of packing mutually deduplicated data into finite-sized container is described in greater detail. Moreover, these figures illustrate calculating a similarity score for grouping the similarly compared files of the mutually deduplicated data into subsets for destaging each of the subsets from a deduplication system to one a finite-sized container.

In one embodiment, a deduplication system may accept many different kinds of incoming data stream (see FIG. 3, 302) of many different sizes for deduplication. These may be virtual tape cartridges, OST images or NAS (user) files. Each input is chopped into 1 GB segments for deduplicating independently by the deduplication engine. After deduplication, these 1 GB segments (see FIG. 3, 308a-n) also may be referred to as "files".

FIG. 3 is a block diagram illustrating an exemplary deduplication system in which aspects of the present invention may be realized. In one embodiment for a deduplication system 300, incoming data stream 302 is deduplicated, storing only the unique data onto a disk subsystem (e.g., repository) that is a part of the deduplicating system. Data 302 presented to a deduplicating system 300 may appear in several forms. These forms may be virtual tape cartridge images 308 in a virtual tape system or files in a network-attached storage (NAS) system. As previously mentioned, a "file" is used to describe the abstract management unit that the deduplicating system uses to bridge between the user's view of the object (stream of bytes that were sent to the deduplicating system, which might be "user files") and the object's internal, deduplicated representation (usually a list of pointers to common and non-common data segments in the repository). For example, the deduplication system 300 may accept virtual tape images 308 (shown as 308*a-n*) that are usually around 100 gigabyte (GB) in size, then splits the images into 1 GB files 308*a-n* for the ease of manipulation. Each 1 GB file 308*a-n* is independent of any other, and each 1 GB file 308*a-n* has its own storage 310 (shown in FIG. 3 as 310*a-n*), possibly shared with another other 1 GB files 308*a-n* in the repository. Next, a similarity search is provided to scan the 1 GB segments 308*a-n* of the incoming data stream 302, finding the data in the repository (312, 310*a-n*) that is most similar to the input data. The "input" is the incoming data stream 302, split into 1 GB segments 308*a-n*. The deduplication engine 304 finds data in the 1 GB segments 308*a-n* that is similar to the existing data in the repository (312, 310), and storing the inputs 302 in the form of 308 (illustrated as 308*a-n*), i.e. pointers to common data blocks 310*a-n*. The similarity search employed has a unique advantage over deduplication systems using hash-deduplication techniques in that it deals with 1 GB files in the repository while the hash-deduplication techniques can only deal with the small blocks that result from the segmentation. These blocks typically average 8 KB in size, and so there are a huge number of these small blocks (i.e., about $2^{37} \sim = 1.3 * 10^{11}$) in a 1 Petabyte (PB) repository. A deduplication engine is provided for examining each 1 GB file at ingest time (e.g., the process of importing external data into a system), and finds other files 312 that are the most similar the file. In other words, each 1 GB segments 308*a-n* of the incoming data stream 302 is examined and searches for other files 312 (e.g., depicted in the FIG. 3 as 1 GB but that size may vary depending on user preferences) in the repository that are most similar to the 1 GB segments 308*a-n* of the incoming data stream 302. This provides the basis for finding common data, and this information of similar files may be used for byte-wise comparisons between the files. The newly ingested file is stored as a series of pointers to the common data and to the places where its unique data is stored. The information regarding other files that were similar is not maintained.

The deduplication engine 304, described herein, is enhanced with the ability of to maintain information about which files 308*a-n* at ingestion were similar to other files 312 already in the repository and provide a similarity score to these files for indicating how similar they actually are (based on the percentage of common data that they share). Then, when a user indicates which files should be stored outside the deduplication system, the information garnered above (e.g., the similarity score between the files) is used to group these files into subsets, which reflect which files deduplicated well together. (By deduplicating well together, a relationship is maintained between the new input 302, as it was converted to internal 1 GB representation 308*a-n*, and the most similar files 312 already in the repository when 302 arrived.) Then each of these groups is stored together in an external finite container (e.g. physical tape cartridges). In other words, mutually deduplicated data having a higher similarity score are preferred to be stored in the same external finite-sized container, since the deduplication between them can save space in that container. (The similarity score may be a certain percentile predefined by a user). As such, this process increases feasibility and productivity by essentially allowing for calculating intersections between the input and symmetric transitive closures of a sparse graph with at most $10^6$ entries, which is much more traceable than dealing with $10^{11}$ elements. This "input" refers to what the user wants to pack into containers, which is different than the input 302, as described above. The 10^6 refers to the number of 1 GB files, and the 10^11 refers to the number of 8 KB blocks, which is the work that would be required if there is no similarity index.

As will be described in FIG. 4, a deduplicating system may pack mutually deduplicated entities into a minimal number of physical tape cartridges. The sum of the space of all the cartridges needed to do so would be proportional to the repository size. The sum of the space of all the cartridges is also close to the overall deduplication ratio, rather than to the nominal size (i.e., the total user data stored in the repository if expanded to original size). Turning now to FIG. 4, a flowchart illustrating an exemplary method 400 for packing deduplicated data into a plurality of finite-sized containers is depicted. The method 400 begins processing (step 402) by calculating a similarity score between similarly compared files of the deduplicated data (step 404). The similarity score is used for grouping the similarly compared files of the deduplicated data into subsets for destaging each of the subsets from a deduplication system to one of the finite-sized containers (step 406). The method 400 ends (step 408).

The deduplication engine calculates the data in common between each file and files already exiting in the repository. The deduplication system may store the new file as a list of pointers to existing and new 16 KB blocks or parts thereof. In addition to this process, statistical information, indicating the similarity of the new file and other the files found to be similar to the new file, is stored. A "file similarity index" may be used to store the statistical information. More specifically, each entry in the file similarity index has 3 fields: one entry for each of the identities of the two similar files and a score-based similarity that indicates the similarity between each pair of two similar files. This score-based similarity may be the percentage of the 16 KB blocks that each of the similarity files share when divided by the average size of the files.

The score-based similarity between two files defined is symmetric. For example, if file "A" is 80% similar to file "B" (and file A and file B are both of the same size), then file B is 80% similar to file A. The relation is also transitive. For example, if file A and file B share 80% of data, and file B and file C share 70% of data, then file A and file C share at least 56% (80%×70%) of data. This transitive relationship allows for increased efficiency when looking for other candidate files (e.g., similar files) to pack with a file by concentrating on the set of files in the symmetric transitive closure of the file that contain at least some percent of common data. The symmetric transitive closure of the file thereby indicates the minimum space that can be saved if these files are copied to the same external finite-sized container. This process of packing mutually deduplicated entities into a minimal number of physical tape cartridges is further demonstrated below in FIG. 5.

Figure 5A:
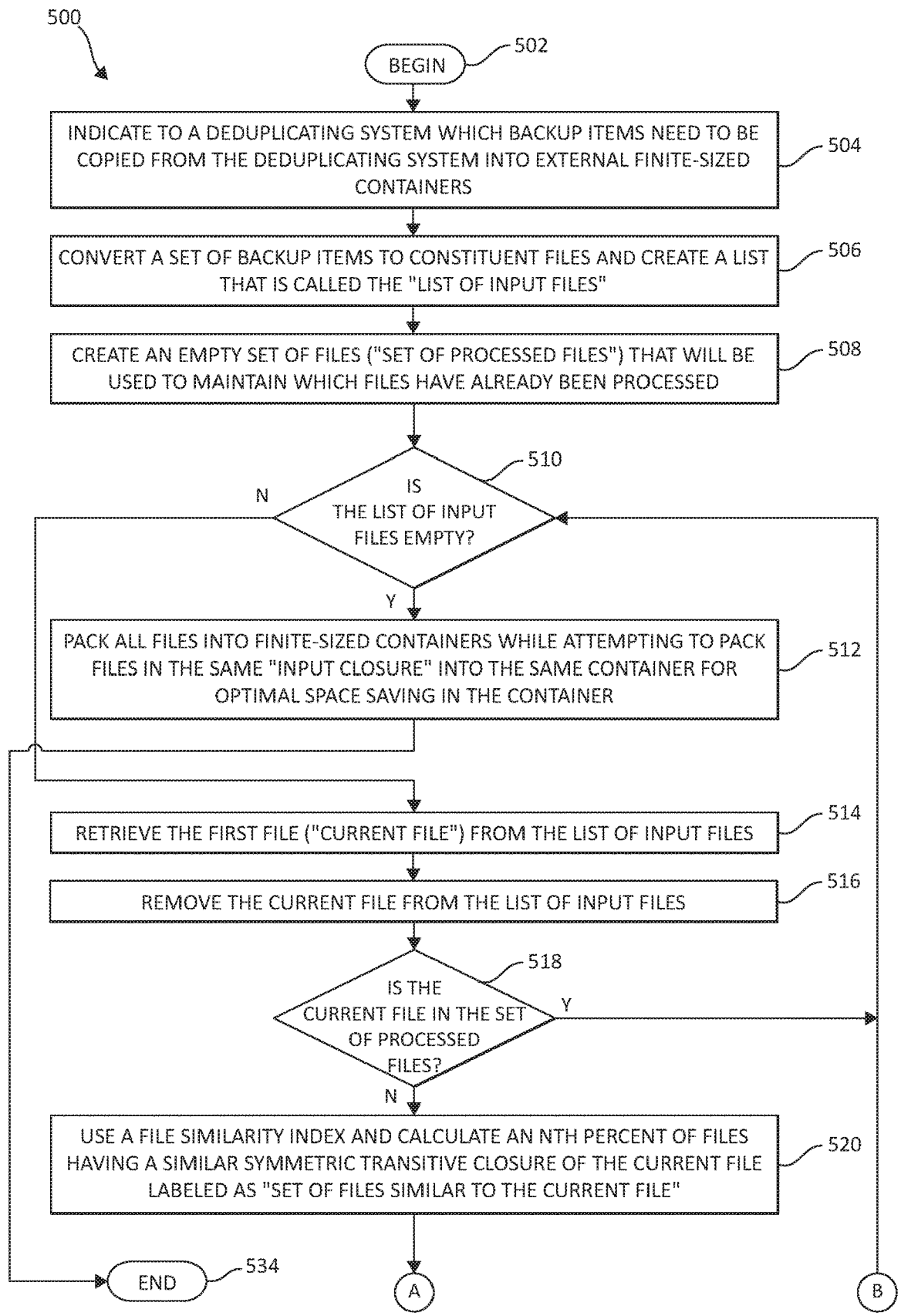
FIG. 5A-B is a flowchart illustrating an additional exemplary method for packing deduplicated data into a plurality of finite-sized containers.
Figure 5B:
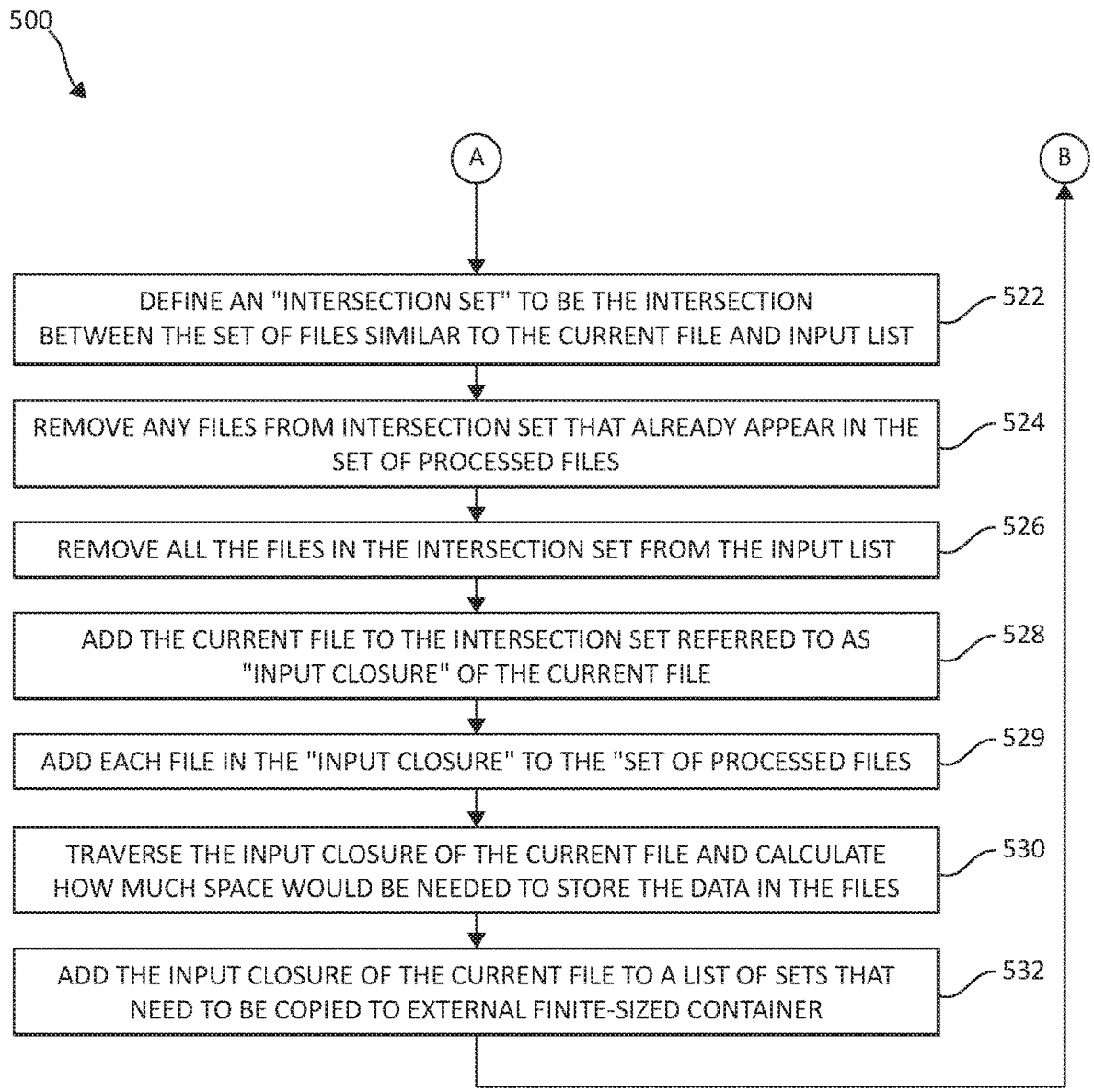

FIG. 5A-B, below, is a flowchart illustrating an additional exemplary method 500 for packing mutually deduplicated data into a finite-sized container. The method 500 may indicate to a deduplicating system, which backup items need to be copied from the deduplicating system into external finite-sized containers (step 504). By way of example only, these containers may be physical tape cartridges or any other fixed or variable sized data container that may or may not be removable or transportable such as removable hard disk drives or solid-state devices (SSD) such as flash memory drives or equivalent. A set of backup items are converted to constituent 1 GB files (see FIG. 3, 308a-n) and a list is created that is called the "list of input files" (step 506). An initially empty set of files ("set of processed files") is created that will be used to maintain which files have already been processed (step 508). The method 500 may determine if the list of input files are empty (step 510). If the list of input files is empty, the method 500 may commence packing sets of deduplicated data into external finite cartridges, since all files have been categorized into the input closures for each file (step 512), and then end. In other words, the method may pack all files into finite-sized containers while attempting to pack files in the same "input closure" into the same container for optimal space saving in the container. If the list of input files is not empty, the method 500 may retrieve the first file ("current file") from the list of input files (step 514). The current file is removed from the list of input files (step 516). The method 500 determines if the current file is in the set of processed files (step 518). If the current file is in the set of processed files, the method 500 returns to step 510. If the current file is not in the set of processed files, the method 500 may use a file similarity index and calculate an nth percent of files with a similar symmetric transitive closure of the current file labeled as "set of files similar to the current file" (step 520).

The method 500 may define an "intersection set" to be the intersection between the set of files similar to the current file and input list (step 522). The intersection set is the set of files that, if copied to the same external finite-sized container, would save the most space in that container. Any files from the intersection set, which already appear in the set of processed files, are removed (step 524). All of the files in the intersection set are removed from the input list (step 526). The current file is added to the intersection set and may be referred to as "input closure" of the current file (step 528). All the files in the "input closure" are added to the "set of processed files" (step 529). The input closure of the current file is traversed and a storage space metric, representing an upper bound to the amount of space needed to store the data in the files, is calculated (step 530). This storage space metric is the space that the input closure would require in an external finite-sized container if other incidental deduplicated data between different "input closure" sets is not taken into account. The input closure of the current file is added to a list of the set of files that need to be copied to external finite-sized container (step 532) and the method 500 returns to step 510. The input to the packing is the list of sets of input closures that need to be copied to the external finite-sized container, with each of the sets of input closures having a respective metric of the upper bound of the space needed for the packing the deduplicated data into the external, finite cartridges.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for rehydrating deduplicated data, by packing the deduplicated data into a plurality of finite-sized containers using a processor device, comprising:
    calculating a similarity score between a plurality of similarly compared files of the deduplicated data, the similarity score indicating an overall deduplication ratio between the similarly compared files of the deduplicated data, wherein calculating the similarity score further includes calculating an nth percentage threshold of common data intersections shared between the plurality of similarly compared files of the deduplicated data, and wherein a transitive closure between the plurality of similarly compared files of the deduplicated data is determined;
    using the similarity score for grouping the plurality of similarly compared files of the deduplicated data into subsets for destaging each of the subsets from a deduplication system to one of the plurality of finite-sized containers, wherein a sum a data space of all of the plurality of the plurality of finite-sized containers is substantially equal to the overall deduplication ratio;
    receiving an indication by a user which of the plurality of similarly compared files are to be grouped into the subsets for destaging each of the subsets from a deduplication system to one of the plurality of finite-sized containers;
    using the transitive closures for assisting with using the similarity score for grouping the plurality of similarly compared files of the deduplicated data into the subsets;
    calculating a storage metric value by traversing the each of the subsets for determining a required storage space in one of the plurality of finite-sized containers, wherein the storage metric value is an upper bound of a maximum amount of storage space each respective subset would require for storing in the one of the plurality of finite-sized containers were incidental deduplicated data identified between the respective subset and alternative ones of the subsets not accounted for; and
    maintaining in a file similarity index an identify of each of the plurality of similarly compared files and the similarity score calculated for each of the plurality of similarly compared files.

2. The method of claim 1, further including comparing previously deduplicated data files in a deduplication system with new data files that are to be deduplicated into the deduplication system at ingestion time for creating the plurality of similarly compared files of the deduplicated data.

3. A system for rehydrating deduplicated data, by packing the deduplicated data into a plurality of finite-sized containers in a computing environment, comprising:
    a processor device, operable in the computing environment, wherein the at least one processor device performs each of:
    calculating a similarity score between a plurality of similarly compared files of the deduplicated data, the similarity score indicating an overall deduplication ratio between the similarly compared files of the deduplicated data, wherein calculating the similarity score further includes calculating an nth percentage threshold of common data intersections shared between the plurality of similarly compared files of the deduplicated data, and wherein a transitive closure between the plurality of similarly compared files of the deduplicated data is determined,
    using the similarity score for grouping the plurality of similarly compared files
    of the deduplicated data into subsets for destaging each of the subsets from a deduplication system to one of the plurality of finite-sized containers, wherein a sum a data space of all of the plurality of the plurality of finite-sized containers is substantially equal to the overall deduplication ratio,
    receiving an indication by a user which of the plurality of similarly compared
    files are to be grouped into the subsets for destaging each of the subsets from a deduplication system to one of the plurality of finite-sized containers,
    using the transitive closures for assisting with using the similarity score for
    grouping the plurality of similarly compared files of the deduplicated data into the subsets;
    calculating a storage metric value by traversing the each of the subsets for
    determining a required storage space in one of the plurality of finite-sized containers, wherein the storage metric value is an upper bound of a maximum amount of storage space each respective subset would require for storing in the one of the plurality of finite-sized containers were incidental deduplicated data identified between the respective subset and alternative ones of the subsets not accounted for; and
    maintaining in a file similarity index an identify of each of the plurality of
    similarly compared files and the similarity score calculated for each of the plurality of similarly compared files.

4. The system of claim 3, wherein the processor device compares previously deduplicated data files in a deduplication system with new data files that are to be deduplicated into the deduplication system at ingestion time for creating the plurality of similarly compared files of the deduplicated data.

5. A computer program product for rehydrating deduplicated data, by packing the deduplicated data into a plurality of finite-sized containers by a processor device, the computer program product comprising a non-transitory computer-readable storage medium having computer-readable program code portions stored therein, the computer-readable program code portions comprising:

an executable portion for calculating a similarity score between a plurality of similarly compared files of the deduplicated data, the similarity score indicating an overall deduplication ratio between the similarly compared files of the deduplicated data, wherein calculating the similarity score further includes calculating an nth percentage threshold of common data intersections shared between the plurality of similarly compared files of the deduplicated data, and wherein a transitive closure between the plurality of similarly compared files of the deduplicated data is determined;

an executable portion for using the similarity score for grouping the plurality of similarly compared files of the deduplicated data into subsets for destaging each of the subsets from a deduplication system to one of the plurality of finite-sized containers, wherein a sum a data space of all of the plurality of the plurality of finite-sized containers is substantially equal to the overall deduplication ratio;

an executable portion for receiving an indication by a user which of the plurality of similarly corn pared files are to be grouped into the subsets for destaging each of the subsets from a deduplication system to one of the plurality of finite-sized containers;

an executable portion for using the transitive closures for assisting with using the similarity score for grouping the plurality of similarly corn pared files of the deduplicated data into the subsets;

an executable portion for calculating a storage metric value by traversing the each of the subsets for determining a required storage space in one of the plurality of finite-sized containers, wherein the storage metric value is an upper bound of a maximum amount of storage space each respective subset would require for storing in the one of the plurality of finite-sized containers were incidental deduplicated data identified between the respective subset and alternative ones of the subsets not accounted for; and an executable portion for maintaining in a file similarity index an identify of each of the plurality of similarly compared files and the similarity score calculated for each of the plurality of similarly compared files.

6. The computer program product of claim 5, further including an executable portion for comparing previously deduplicated data files in a deduplication system with new data files that are to be deduplicated into the deduplication system at ingestion time for creating the plurality of similarly compared files of the deduplicated data.

* * * * *